No. 801,425. PATENTED OCT. 10, 1905.
R. WEIDEMAN.
VEHICLE WHEEL.
APPLICATION FILED JAN. 21, 1905.

WITNESSES:
D. E. Carlsen.
E. C. Carlsen.

INVENTOR:
Robert Weideman.
BY his ATTORNEY:
A. M. Carlsen.

UNITED STATES PATENT OFFICE.

ROBERT WEIDEMAN, OF HAWKEYE, IOWA.

VEHICLE-WHEEL.

No. 801,425.      Specification of Letters Patent.      Patented Oct. 10, 1905.

Application filed January 21, 1905. Serial No. 242,175.

*To all whom it may concern:*

Be it known that I, ROBERT WEIDEMAN, a citizen of the United States, residing at Hawkeye, in the county of Fayette and State of Iowa, have invented certain new and useful Improvements in Vehicle-Wheels; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to wheels for bicycles, tricycles, automobiles, and all kinds of vehicles which it is desirable should run with ease and comfort to the riders.

The object of the invention is partly to provide a substitute for pneumatic tires, which are so easily punctured and otherwise put out of service, and partly to provide a substitute for the springs heretofore used between the axles and the bottom of the box or body of vehicles. This object I attain by the novel construction and combination of parts illustrated in the accompanying drawings, in which—

Figure 1:
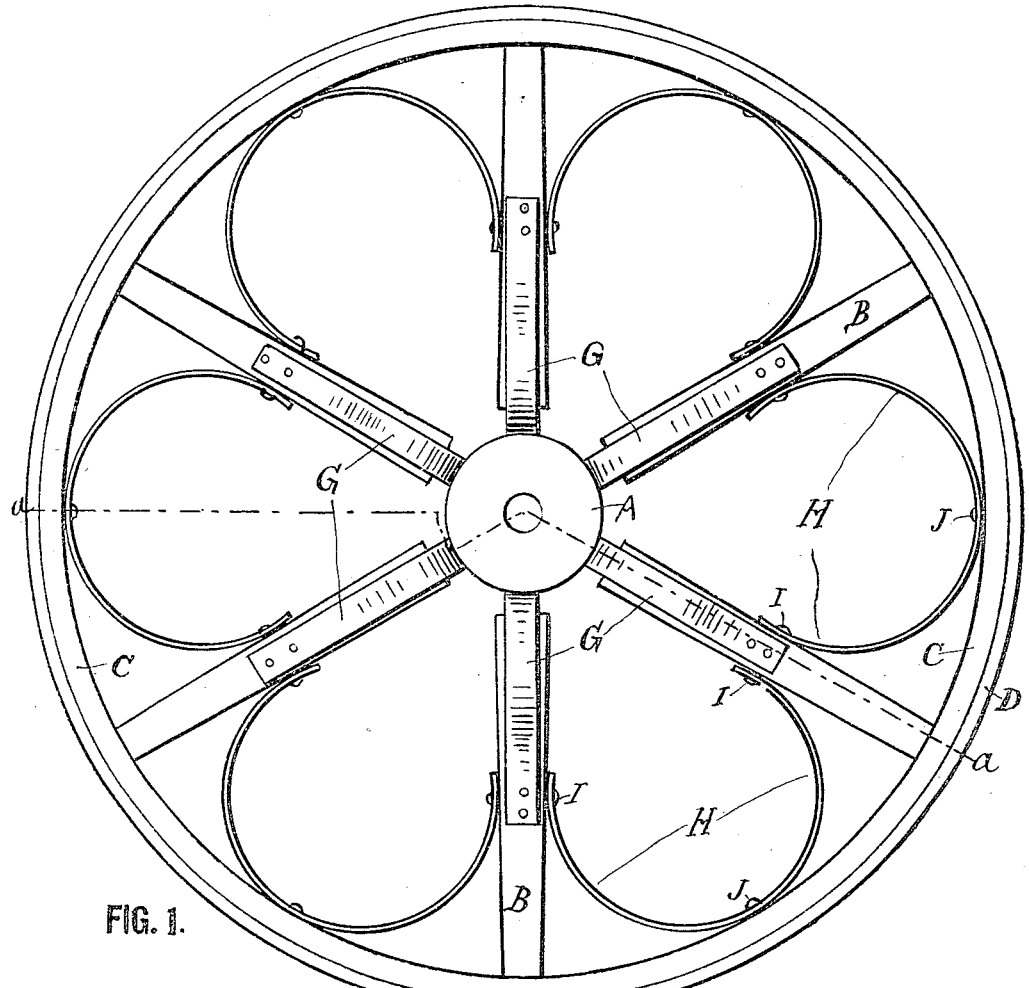
Figure 2:
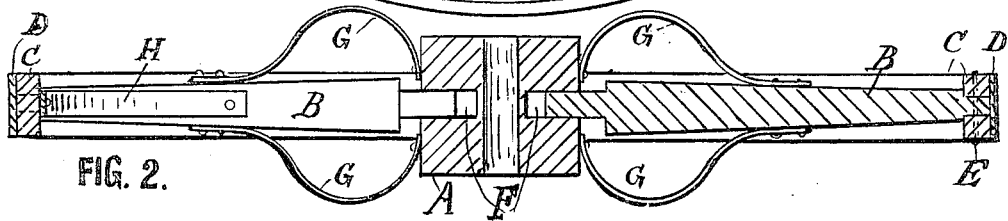

Figure 1 is a side elevation of a wheel embodying the principles of my invention. Fig. 2 is a sectional view about as on the line *a a* in Fig. 1.

Referring to the drawings by letters of reference, A is the hub, B the spokes, and C the felly, of the wheel. The felly may be of any suitable material. If of iron, the tire D may be of solid rubber, if of wood the tire may be of iron. The spokes are secured to the felly by pins E or any other suitable means, and the inner ends of the spokes are slidably inserted in radial sockets F in the hub. The spokes are normally held or pressed radially outward by springs G, which may be of any suitable construction; but I have shown what I consider a preferable form—namely, a kind of bow-spring secured at opposite sides of each spoke with one end to the spoke and the other to the hub.

In order to facilitate the sliding motion of the spokes in the hub, the felly is made comparatively light and springy. Owing to such lightness, as well as the considerable distance between the spokes necessary to keep the sockets F properly separated, the inner side of the felly is between the spokes supported or resisted by bow-springs H, preferably made in the form shown and secured to the spokes at I and to the felly at J.

It is obvious that when the wheel is in use and the axle (not shown) presses the hub toward the ground the springs G and H form yielding cushions as they pass between the axle and the ground.

In many instances it will be best to have either the whole spoke or at least the tenon sliding in the hub made of metal and also the hub or the sockets in the hub lined with metal, so that the sliding surfaces will be more durable; but as it is old to provide wearing-surfaces with metallic linings and it is easily understood how the same may be applied in the present invention I have not illustrated the linings.

Having thus described my invention, what I claim, and desire to secure by Letters Patent, is—

A wheel of the class described, the same comprising a springy felly and spokes secured thereto, a hub having radial sockets for the inner ends of the spokes to slide in, and springs secured to the spokes and to the hub to resist the inward sliding of the spokes, and springs engaging the spokes and the felly intermediate the spokes.

In testimony whereof I affix my signature in presence of two witnesses.

ROBERT WEIDEMAN.

Witnesses:
    NICHOLAS REISNER,
    HERMAN SCHULZ.